US008388916B2

(12) United States Patent
Bonan et al.

(10) Patent No.: US 8,388,916 B2
(45) Date of Patent: Mar. 5, 2013

(54) PROCESS FOR PRODUCTION OF COMMERCIAL QUALITY POTASSIUM NITRATE FROM POLYHALITE

(75) Inventors: Michael Bonan, Rekhasim (IL); Eyal Ginzberg, Zikhron-Yaakov (IL); Akiva Mozes, Rishon Lezion (IL); Eyal Barnea, Nesher (IL); Hugo Keselman, Carmiel (IL); Gideon Friedman, Haifa (IL); Ron Frim, Haifa Bay (IL); Cornelis Petrus Langeveld, Zuidoostbeemster (NL)

(73) Assignee: IMI Tami Institute for Research and Development, Haifa Bay (IL)

( * ) Notice: Subject to any disclaimer, the term of this patent is extended or adjusted under 35 U.S.C. 154(b) by 0 days.

(21) Appl. No.: 13/380,550

(22) PCT Filed: Jun. 27, 2010

(86) PCT No.: PCT/IL2010/000515
§ 371 (c)(1),
(2), (4) Date: Apr. 18, 2012

(87) PCT Pub. No.: WO2010/150267
PCT Pub. Date: Dec. 29, 2010

(65) Prior Publication Data
US 2012/0201737 A1 Aug. 9, 2012

Related U.S. Application Data
(60) Provisional application No. 61/220,232, filed on Jun. 25, 2009.

(51) Int. Cl.
C01D 9/00 (2006.01)
C01D 9/02 (2006.01)
C05D 1/00 (2006.01)
C05D 1/04 (2006.01)

(52) U.S. Cl. .............. 423/194; 423/395; 71/58
(58) Field of Classification Search .............. 423/170, 423/194, 395–398, 184, 202, 643; 71/31, 71/59, 58, 64.08
See application file for complete search history.

(56) References Cited

U.S. PATENT DOCUMENTS
| | | | | |
|---|---|---|---|---|
| 2,136,996 A | * | 11/1938 | Wiedbrauck et al. | 423/184 |
| 4,246,019 A | * | 1/1981 | Sokolov et al. | 71/59 |
| 6,274,105 B1 | | 8/2001 | Vorage et al. | |

FOREIGN PATENT DOCUMENTS
| | | |
|---|---|---|
| CA | 1217027 | 1/1987 |
| DE | 35256654 A1 | 1/1987 |

OTHER PUBLICATIONS
Davidson et al, "Potash from Polyhalite," 1937, Industrial and Engineering Chemistry, vol. 29, No. 4, pp. 475-482.*

(Continued)

Primary Examiner — Steven Bos
Assistant Examiner — Justin Bova
(74) Attorney, Agent, or Firm — The Law Office of Michael E. Kondoudis

(57) ABSTRACT

A method for the production of $KNO_3$ from polyhalite is provided. The method comprises steps of decomposing said polyhalite into syngenite, gypsum, and soluble components, treating the solid decomposition products sequentially with $HNO_3$ and Ca basic compound, precipitating the $CaSO_4$ thus formed, and crystallizing the $KNO_3$ from the solution remaining. The method recovers up to 75% of the potassium present in the raw polyhalite as $KNO_3$ and substantially all of the remainder as a potassium magnesium sulfate salt.

18 Claims, 1 Drawing Sheet

OTHER PUBLICATIONS

Gabriel et al, "Production of Potassium Sulfate from Polyhalite and Sylvinite,"1935, Industrial and Engineering Chemistry, vol. 27, No. 7, pp. 801-805.*

Gabriel et al., "Production of Potassium Sulfate from Polyhalite and Sylvinite", Industrial and Engineering Chemistry, 1935, pp. 801-806, vol. 27, No. 7, Retrieved from <<http://pubs.acs.org/doi/abs/10.1021/ie50307a013>> on Oct. 21. 2010.

Davidson et al., "Potash from Polyhalite Relation Between Calcinations Conditions and Extraction Behavior", Industrial and Engineering Chemistry, 1937, pp. 475-482, vol. 29, No. 4, Retrieved from <<http://pubs.acs.org/doi/abs/10.1021/ie50328a027>> on Oct. 23, 2010.

Conley et al., "Equilibria in the System Potassium Sulfate-Magnesium Sulfate-Calcium Sulfate-Water at 100degC", Journal of Physical Chemistry, 1938, pp. 587-616, vol. 42, No. 5, Retrieved from <<http://pubs.acs.org/doi/abs/10.1021/j100900a004>>, on Oct. 21, 2010.

International Search Report and Written Opinion dated Nov. 15, 2010 in corresponding International Application No. PCT/IL2010/000515.

Cartridge, E.P., "Texas-New Mexico polyhalite as a source of potash for fertilizer", Ind. Eng. Chem, 1932, p. 895, vol. 24.

* cited by examiner

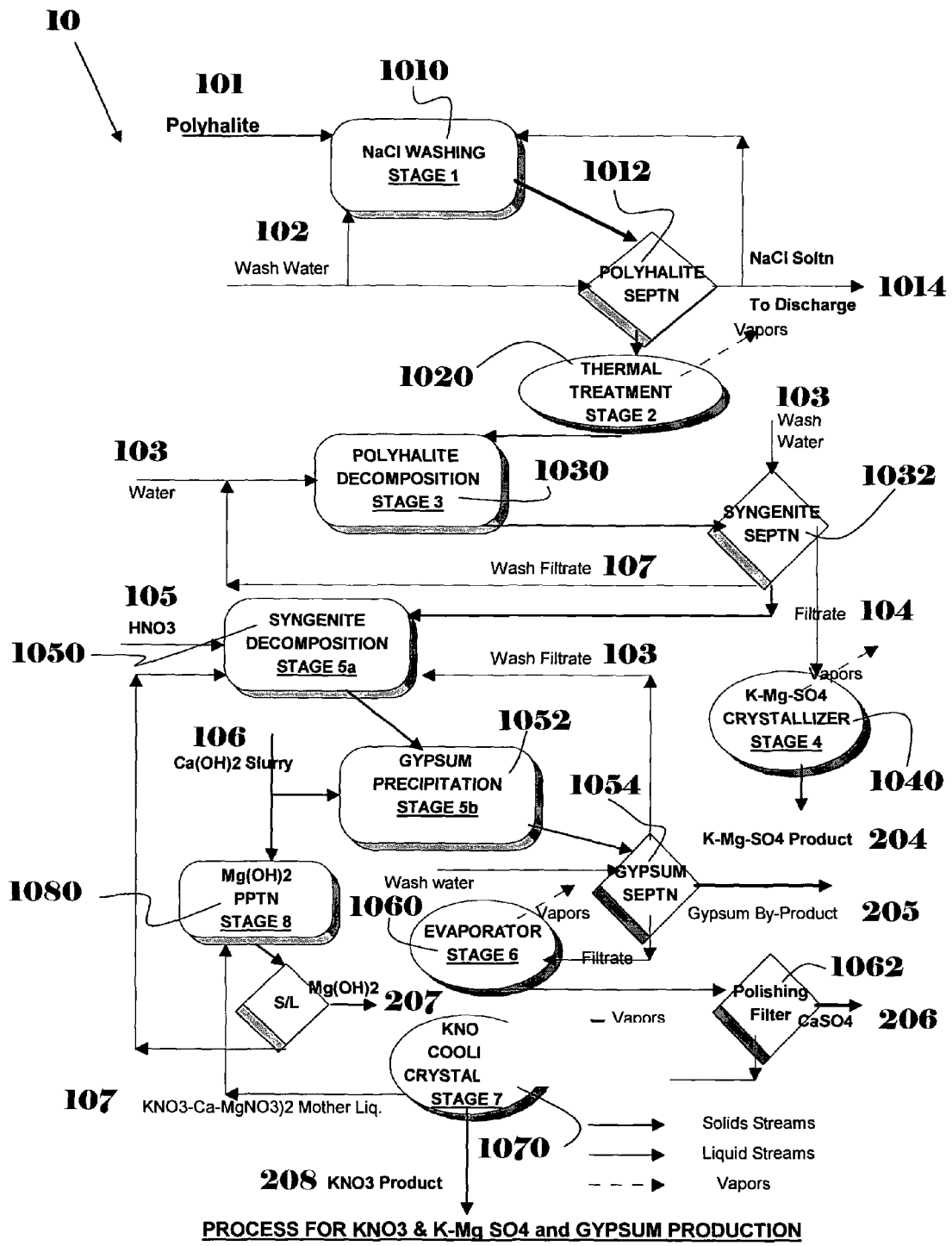
PROCESS FOR KNO3 & K-Mg SO4 and GYPSUM PRODUCTION

PROCESS FOR PRODUCTION OF COMMERCIAL QUALITY POTASSIUM NITRATE FROM POLYHALITE

REFERENCE TO RELATED PUBLICATION

This application claims priority from U.S. provisional application 61/220,232, dated 25 Jun. 2009, which is hereby incorporated by reference in its entirety.

FIELD OF THE INVENTION

This invention concerns improved methods for the production of $KNO_3$ and potassium and magnesium sulfates from polyhalite.

BACKGROUND OF THE INVENTION

Potassium nitrate, $KNO_3$, is an industrially important chemical with a variety of uses from fertilizers to explosives. It is primarily obtained either by mining of $KNO_3$ deposits or by methods that ultimately derive from nitrogen fixation via the Haber process.

Methods for production of $KNO_3$ from syngenite ($K_2Ca(SO_4)_2$) are known in the literature. For example, Canadian Pat. No. 1217027 to Worthington et al. and German patent 3525654 to Löblich et al. disclose methods for producing $KNO_3$ from syngenite via reaction with $CaNO_3.4H_2O$.

Polyhalite, $Ca_2MgK_2(SO_4)_4.2H_2O$, is widely distributed and readily available potassium-containing mineral. It has been known for some eight decades (see, for example, Partridge, E. P. *Ind Eng. Chem.* 1932, 24, 895) that polyhalite can be a useful starting material for production of potash and potassium sulfate. Commercially viable methods that use polyhalite as a starting material for formation of $KNO_3$ remain as yet unknown, however. A more efficient means for converting raw polyhalite into salts such as potassium nitrate, while increasing the quantity of gypsum relative to that in the raw polyhalite and controlling the relative quantity of $KNO_3$ and potassium magnesium sulfates produced from the polyhalite, remains a long-felt need.

SUMMARY OF THE INVENTION

The invention herein disclosed is designed to meet this long-felt need. The method herein disclosed recovers at least 45% to 75% of the potassium content of polyhalite, primarily as commercial-quality $KNO_3$, with the remainder as potassium magnesium sulfate or as a mixture of sulfate salts.

It is therefore an object of the present invention to disclose a continuous method for producing $KNO_3$ from polyhalite, said method comprising steps of (a) washing polyhalite; (b) heating said washed polyhalite; (c) contacting said washed and heated polyhalite with sufficient water to produce decomposition products comprising $K_2Ca(SO_4)_2$, gypsum, and a solution comprising $K^+$, $Mg^{2+}$, and $SO_4^{2-}$ ions; (d) separating at least one solid product from said solution; (e) contacting solids obtained from said step of contacting said washed and heated polyhalite with water with a quantity of $HNO_3$ at least sufficient to produce a slurry; (f) contacting said slurry with an alkaline Ca compound; (g) filtering said slurry; (h) washing gypsum obtained in said steps of contacting said washed and heated polyhalite with water and of treating said slurry with an alkaline Ca compound; (i) concentrating the filtrate obtained in said step of filtering the product of said step of treating said slurry with an alkaline Ca compound; (j) separating at least part of the $CaSO_4$ contained in said filtrate from the liquid; (k) separating $KNO_3$ from the solution recovered after said step of separating at least part of the $CaSO_4$ contained in said filtrate; (l) adding a basic Ca compound to the solution recovered after said step of separating $KNO_3$ from the solution recovered after said step of separating at least part of the $CaSO_4$ contained in the filtrate; and (m) separating at least part of the $Mg(OH)_2$ produced in said step of adding an alkaline Ca compound to the solution recovered after said step of separating $KNO_3$. It is within the essence of the invention wherein said method is adapted to produce commercial quality $KNO_3$ from raw polyhalite.

It is a further object of this invention to disclose such a method, wherein between 45% and 75% of the K value of said polyhalite is recovered as $KNO_3$, and further wherein substantially all of the remaining K value of said polyhalite is recovered in a form chosen from the group consisting of (a) langbeinite, (b) a mixture of Mg and K sulfate salts, and (c) any combination of the above.

It is a further object of this invention to disclose such a method as defined in any of the above, wherein said step of heating said washed polyhalite further comprises an additional step of heating said washed polyhalite to a temperature between about 400° C. and about 500° C.

It is a further object of this invention to disclose such a method as defined in any of the above, wherein said step of heating said washed polyhalite further comprises an additional step of heating said washed polyhalite to a temperature of about 450° C.

It is a further object of this invention to disclose such a method as defined in any of the above, wherein said step of contacting said washed and heated polyhalite with sufficient water to produce decomposition products comprising $K_2Ca(SO_4)_2$, gypsum, and a solution comprising $K^+$, $Mg^{2+}$, and $SO_4^{2-}$ ions occurs at a temperature between about 20° C. and about 70° C.

It is a further object of this invention to disclose such a method as defined in any of the above, wherein said step of contacting said washed and heated polyhalite with sufficient water to produce decomposition products comprising $K_2Ca(SO_4)_2$, gypsum, and a solution comprising $K^+$, $Mg^{2+}$, and $SO_4^{2-}$ ions occurs at ambient temperature.

It is a further object of this invention to disclose such a method as defined in any of the above, wherein said step of contacting said washed and heated polyhalite with sufficient water to produce decomposition products comprising $K_2Ca(SO_4)_2$, gypsum, and a solution comprising $K^+$, $Mg^{2+}$, and $SO_4^{2-}$ ions further comprises an additional step of choosing a polyhalite/water ratio such that substantially all of the $Mg^{2+}$ and less than about 55% of the $K^+$ originally present in the raw polyhalite remains in solution.

It is a further object of this invention to disclose such a method as defined in any of the above, wherein said step of separating at least one solid product from said solution further comprises an additional step of separating at least one solid chosen from the group consisting of (a) potassium sulfate salts; (b) magnesium sulfate salts; (c) potassium magnesium sulfate mixed salts.

It is a further object of this invention to disclose such a method as defined in any of the above, wherein said step of separating at least one solid product from said solution further comprises an additional step of precipitating a solid.

It is a further object of this invention to disclose such a method as defined in any of the above, wherein said step of separating at least one solid product from said solution further comprises an additional step of crystallizing said at least one solid product from said solution.

It is a further object of this invention to disclose such a method as defined in any of the above, wherein said step of contacting solids obtained from said step of contacting said washed and heated polyhalite with water with a quantity of $HNO_3$ at least sufficient to produce a slurry further comprises an additional step of recycling at least part of the solution recovered after said step of separating at least part of the $Mg(OH)_2$ produced in said step of said alkaline Ca compound to the solution recovered after said step of separating $KNO_3$.

It is a further object of this invention to disclose such a method as defined in any of the above, wherein said step of contacting said slurry with said alkaline Ca compound further comprises an additional step of contacting said slurry with a quantity of said alkaline Ca compound to reduce the sulfate content by at least 99% while maintaining a pH below 8.

It is a further object of this invention to disclose such a method as defined in any of the above, wherein said step of separating at least part of the $CaSO_4$ contained in said filtrate from the liquid further comprises an additional step of separating more than half of the $CaSO_4$ contained in said filtrate from the liquid.

It is a further object of this invention to disclose such a method as defined in any of the above, wherein said step of separating at least part of the $CaSO_4$ contained in said filtrate from the liquid further comprises an additional step of separating substantially all of the $CaSO_4$ contained in said filtrate from the liquid.

It is a further object of this invention to disclose such a method as defined in any of the above, wherein said step of separating at least part of the $CaSO_4$ contained in said filtrate from the liquid further comprises an additional step of separating said $CaSO_4$ by crystallization.

It is a further object of this invention to disclose such a method, further including an additional step of concentrating said filtrate.

It is a further object of this invention to disclose such a method, further including an additional step of evaporating at least part of the liquid from said filtrate.

It is a further object of this invention to disclose such a method as defined in any of the above, wherein said step of evaporating is effected by a method chosen from the group consisting of (a) multiple effect evaporation; (b) mechanical vapor recompression; (c) solar evaporation.

It is a further object of this invention to disclose such a method as defined in any of the above, wherein said step of separating $KNO_3$ from the solution recovered after said step of separating at least part of the $CaSO_4$ contained in said filtrate further comprises an additional step of separating $KNO_3$ from said solution by crystallization.

It is a further object of this invention to disclose such a method, wherein said step of separating $KNO_3$ from said solution by crystallization is carried our in a cooling crystallizer.

It is a further object of this invention to disclose such a method as defined in any of the above, further comprising an additional step of purifying the $KNO_3$ recovered.

It is a further object of this invention to disclose such a method, further comprising an additional step of repulping with a substantially pure $KNO_3$ solution.

It is a further object of this invention to disclose such a method, further comprising an additional step of recrystallizing said $KNO_3$.

It is a further object of this invention to disclose such a method as defined in any of the above, wherein said step of separating at least part of the $Mg(OH)_2$ produced in said step of adding $Ca(OH)_2$ to the solution recovered after said step of separating $KNO_3$ further comprises an additional step of separating $KNO_3$ by crystallization.

It is a further object of this invention to disclose such a method as defined in any of the above, further including the additional step of recovering at least, part of the gypsum produced during the process.

It is a further object of this invention to disclose such a method as defined in any of the above, wherein said alkaline Ca compound is chosen from the group consisting of (a) $Ca(OH)_2$, (b) CaO, (c) $CaCO_3$, and (d) any combination of the above.

BRIEF DESCRIPTION OF THE FIGURE

FIG. 1 shows a schematic flowchart of a combined process for treatment of polyhalite according to one embodiment of the present invention.

DETAILED DESCRIPTION OF THE PREFERRED EMBODIMENTS

The present invention is described hereinafter with reference to the drawing, in which preferred embodiments are described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figures and described in the specification, but only as indicated in the accompanying claims, with the proper scope determined only by the broadest interpretation of said claims.

Unless specifically indicated to the contrary, chemical formulas are given without regard to the presence or absence of water of hydration, or the stoichiometry of hydration of the salt.

As used herein, the generic term "sulfate salt" includes any salt that contains an anion of the general formula $H_aS_bO_c^{n-}$, including anions where a=0.

As used herein, the term "crystallizing" includes any technique known in the art for precipitating a solid from a solution.

The method disclosed herein for production of $KNO_3$ from polyhalite involves the following two sequential chemical reactions, where x represents the fraction of polyhalite converted into syngenite ($K_2Ca(SO_4)_2 \cdot H_2O$); in preferred embodiments of the invention, x is between about 0.45 and about 0.85.

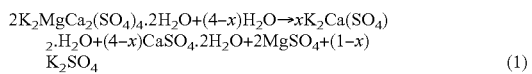

$$2K_2MgCa_2(SO_4)_4 \cdot 2H_2O + (4-x)H_2O \rightarrow xK_2Ca(SO_4)_2 \cdot H_2O + (4-x)CaSO_4 \cdot 2H_2O + 2MgSO_4 + (1-x)K_2SO_4 \quad (1)$$

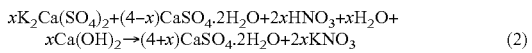

$$xK_2Ca(SO_4)_2 + (4-x)CaSO_4 \cdot 2H_2O + 2xHNO_3 + xH_2O + xCa(OH)_2 \rightarrow (4+x)CaSO_4 \cdot 2H_2O + 2xKNO_3 \quad (2)$$

In summary, in reaction (1), polyhalite is decomposed into syngenite, $CaSO_4$ (gypsum), and $MgSO_4$. In reaction (2), the syngenite and gypsum react with nitric acid and calcium hydroxide (introduced separately into the reaction) to yield potassium nitrate.

As discussed in detail below, the reactions are carried out in a series of stages. Reference is now made to FIG. 1, which presents a schematic flowchart of the stages involved in a preferred embodiment 10 of the method disclosed in the present invention for producing $KNO_3$ from polyhalite.

In the first stage 1010 of the method, polyhalite 101 is washed with sufficient water 102 to remove substantially all of the NaCl contained within the polyhalite. The polyhalite is separated from the supernatant liquid (step 1012), and the supernatant NaCl solution is then discharged from the system (step 1014).

In the second stage 1020 of the method, the polyhalite undergoes thermal treatment to dry it. In a preferred embodiment, the polyhalite is dried by heating to 450° C. As is well-known in the art, the effectiveness of the drying is demonstrated by the near-total decomposition of the polyhalite in its reaction in the following step of the process. In preferred embodiments, the heating is performed over a period of at least 20 minutes.

Polyhalite decomposition occurs in stage three (1030). In this stage, polyhalite is contacted with water 103. In preferred embodiments of the invention, the reaction takes place at a temperature between about 20° C. and 70° C. In more preferred embodiments of the invention, the reaction mixture is not heated. In a most preferred embodiment of the invention, reaction takes place at ambient temperature. An amount of water sufficient to decompose the polyhalite is added. The polyhalite decomposes to yield as insoluble products syngenite and gypsum ($CaSO_4 \cdot 2H_2O$). The polyhalite:water ratio and the temperature are chosen such that substantially all of the $Mg^{2+}$ and less than about 55% of the $K^+$ contained in the polyhalite is dissolved; in preferred embodiments, the polyhalite:water ratio (w/w) ranges from about 2:5 to 2:3. This reaction, and means for optimizing the polyhalite:water ratio, are well-known in the art. The syngenite is then separated from the supernatant liquid and washed (step 1032).

In stage 4 (1040), the solution containing $Mg^{2+}$, $K^+$, $SO_4^{2-}$, and traces of $Ca^{2+}$ obtained in the previous stage is concentrated sufficiently to precipitate at least part of the dissolved material to provide solid product 204. In preferred embodiments, the concentration is performed by crystallization. In some embodiments of the invention, $MgSO_4$ solution recycled from stage 8 described below is added to the solution. In preferred embodiments, the solution is concentrated sufficiently to produce solid product 204 $K_xMg_y(SO_4)_{(x/2+y)}$ as a mixture of langbeinite ($K_2Mg_2(SO_4)_3$) and hydrated $MgSO_4$. In some embodiments of the invention, the salts are crystallized separately, while in other embodiments, they are crystallized as a mixture.

In stage 5a of the method (1050), the solids precipitated in stage 3 are treated with $HNO_3$ (105) in order to obtain a solution containing $K^+$, $Ca^{2+}$, and $NO_3^-$, along with small quantities of $Mg^{2+}$ and $SO_4^{2-}$, as well as undissolved solids comprising primarily gypsum. In stage 5b (1052) the slurry obtained in stage 5a is further treated with $Ca(OH)_2$ (106) to precipitate the sulfate as gypsum (205) and to bring the solution substantially to neutral pH. The gypsum precipitated in stages 5a and 5b (step 1054) is washed with water (in preferred embodiments, by counter-current washing on a filter or by continuous washing in equipment) in order to reduce the nitrate content.

In stage 6 (1060), the supernatant liquid obtained in stage 5 is concentrated (in preferred embodiments, by evaporation by methods well-known in the art, e.g. in a multiple effect evaporator, by mechanical vapor recompression, or by solar evaporation). In some embodiments of the invention, the $CaSO_4$ precipitated (206) is separated from the solution (1062) at the exit from the evaporator (in preferred embodiments, by a polishing filter). In embodiments in which solar evaporation is performed, the $CaSO_4$ is left on the bottom of the pond.

In stage 7 (1070), $KNO_3$ (208) is separated from the solution. In preferred embodiments of the invention, the separation is accomplished by crystallization. In most preferred embodiments, the crystallization is carried out in a cooling crystallizer of any appropriate type known in the art, for example, a cooling disc crystallizer. In some embodiments of the invention, the $KNO_3$ produced in stage 7 is further purified by repulping with a pure $KNO_3$ solution or by further recrystallization.

In stage 8 of the method (1080), a second stream comprising an alkaline Ca compound is added to the solution recovered from the crystallizer in order to precipitate the major part of the $Mg^{2+}$ remaining in the solution. The solid $Mg(OH)_2$ (207) thus precipitated can be used as obtained, or reacted with $H_2SO_4$ and the resulting solution added to the solution concentrated in stage 4, as described above. In preferred embodiments, the solution remaining after the crystallization step in stage 8 (107) is recycled into the solution used in stage 3, wherein at least a portion of the $Ca(NO_3)_2$ in the solution reacts with at least a portion of the sulfate to precipitate gypsum.

EXAMPLES

Example 1

Polyhalite was washed with water to remove NaCl and then dried at 450° C. 200 g of washed and dried polyhalite were mixed with 500 g of water at 50° C. After two hours, the slurry was filtered. The solution comprised 1.7% $K^+$, 1.5% $Mg^{2+}$, and 8.1% $SO_4^=$ (w/w).

The solid was examined by XRD; the phases identified were gypsum and syngenite. The solid comprised 16.3% $Ca^{2+}$, 11.3% $K^+$, 0.75% $Mg^{2+}$ and 55% $SO_4^=$. More than 70% of the potassium of the polyhalite remained in the solid phase, while about 85% of the Mg was dissolved.

Example 2

Polyhalite was washed with water to remove NaCl and then dried at 450° C. 200 g of washed and dried polyhalite were mixed with 400 g of water at 50° C. After two hours, the slurry was filtered. The solution comprised 2.2% $K^+$, 1.4% $Mg^{2+}$, and 8.% $SO_4^=$.

The solid comprised 19% $Ca^{2+}$, 6.8% $K^+$, 0.8% $Mg^{2+}$ and 57% $SO_4^=$. About 45% of the potassium content of the polyhalite remained in the solid phase, while about 85% of the Mg was dissolved.

Reaction of 100 g of the wet solids with 23 g of $HNO_3$ (60%) in presence of 900 g of water yielded a solution comprising 3.8% $K^+$ and 0.5% $Mg^{2+}$, while the solid residue contained less than 0.1% of both $Mg^{2+}$ and $K^+$.

We claim:
1. A continuous method for producing $KNO_3$ from raw polyhalite, said method comprising steps of:
   washing raw polyhalite;
   heating said washed polyhalite;
   contacting said washed and heated polyhalite with water to produce decomposition products comprising $K_2Ca(SO_4)_2$, gypsum, and a first solution comprising $K^+$, $Mg^{2+}$, and $SO_4^{2-}$ ions;
   separating at least one solid product from said first solution;
   contacting at least a portion of said at least one solid product separated from said first solution with a quantity of $HNO_3$ at least sufficient to produce a slurry;
   contacting said slurry with an alkaline Ca compound to precipitate sulfate as gypsum;
   filtering said contacted slurry to obtain a filtrate;
   washing gypsum obtained in the preceding steps;

concentrating the filtrate obtained in said step of filtering the product of said step of contacted said slurry with an alkaline Ca compound;

separating at least part of any $CaSO_4$ from said filtrate to yield a second solution;

separating $KNO_3$ from the second solution to yield a third solution recovered;

adding an alkaline Ca compound to the third solution; and, separating at least part of any $Mg(OH)_2$ produced in said step of adding an alkaline Ca compound to the third solution.

2. The method according to claim 1, wherein between 45% and 75% of the K value of said polyhalite is recovered as $KNO_3$, and further wherein substantially all of the remaining K value of said polyhalite is recovered in a form selected from the group consisting of (a) langbeinite, (b) a mixture of Mg and K sulfate salts, and (c) mixtures thereof.

3. The method according to claim 1, wherein said step of heating said washed polyhalite occurs at a temperature of between about 400° C. and about 500° C.

4. The method according to claim 1, wherein said step of contacting said washed and heated polyhalite with water occurs at a temperature between about 20° C. and 70° C.

5. The method according to claim 1, wherein said step of contacting said washed and heated polyhalite with water occurs at ambient temperature.

6. The method according to claim 1, wherein said step of contacting said washed and heated polyhalite with water comprises choosing a polyhalite/water ratio such that substantially all of the $Mg^{2+}$ and less than about 55% of the $K^+$ originally present in the raw polyhalite remains in solution.

7. The method according to claim 1, further comprising concentrating said solution containing $K^+$, $Mg^{2+}$, and $SO_4^{2-}$ ions produced in said step of contacting said washed and heated polyhalite with water sufficiently to precipitate at least one solid selected from the group consisting of (a) potassium sulfate salts; (b) magnesium sulfate salts; and (c) potassium magnesium sulfate mixed salts.

8. The method according to claim 1, wherein said step of separating at least one solid product from said solution further comprises an additional step selected from the group consisting of (a) precipitating a solid and (b) crystallizing at least one solid product from said solution.

9. The method according to claim 1, wherein said step of separating at least part of any $Mg(OH)_2$ produced in said step of adding an alkaline Ca compound to the third solution yields a fourth solution, the method further comprising recycling into the third solution at least part of the fourth solution.

10. The method according to claim 1, wherein said step of contacting said slurry with an alkaline Ca compound reduces the sulfate content of the solution by at least 99% while maintaining a pH below 8.

11. The method according to claim 1, wherein said step of separating at least part of any $CaSO_4$ contained in said filtrate further comprises separating substantially all of the $CaSO_4$ contained in said filtrate.

12. The method according to claim 1, wherein said step of separating at least part of any $CaSO_4$ contained in said filtrate further comprises separating said $CaSO_4$ by crystallization.

13. The method according to claim 12, further including concentrating said filtrate.

14. The method according to claim 1, wherein said step of separating $KNO_3$ comprises separating $KNO_3$ from said solution by crystallization.

15. The method according to claim 1, further comprising purifying $KNO_3$ recovered in said step of separating $KNO_3$.

16. The method according to claim 1, wherein said step of separating at least part of any $Mg(OH)_2$ produced in said step of adding an alkaline Ca compound to the solution recovered after said step of separating $KNO_3$ further comprises separating $Mg(OH)_2$ by crystallization.

17. The method according to claim 1, further including recovering at least part of the gypsum produced during the process.

18. The method according to claim 1, wherein said alkaline Ca compound is selected from the group consisting of (a) $Ca(OH)_2$, (b) CaO, (c) $CaCO_3$, and (d) any combination of the above.

* * * * *